United States Patent
Schmitz

(10) Patent No.: US 7,855,711 B2
(45) Date of Patent: Dec. 21, 2010

(54) CONDUCTIVE ISLANDS FOR PRINTABLE ELECTRONIC PAPER

(75) Inventor: Gregory P. Schmitz, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1498 days.

(21) Appl. No.: 11/226,169

(22) Filed: Sep. 14, 2005

(65) Prior Publication Data

US 2007/0061214 A1    Mar. 15, 2007

(51) Int. Cl.
G09G 3/34 (2006.01)
D04H 1/00 (2006.01)

(52) U.S. Cl. .................. 345/107; 345/86; 428/292.1

(58) Field of Classification Search .............. None
See application file for complete search history.

(56) References Cited

U.S. PATENT DOCUMENTS

| | | | |
|---|---|---|---|
| 4,126,854 A | 11/1978 | Sheridon | |
| 5,389,945 A | 2/1995 | Sheridon | |
| 6,222,513 B1 | 4/2001 | Howard et al. | |
| 6,235,395 B1 | 5/2001 | Sacripante et al. | |
| 6,243,058 B1 | 6/2001 | Mikkelsen et al. | |
| 6,456,272 B1 | 9/2002 | Howard et al. | |
| 7,663,582 B2 * | 2/2010 | Schmitz et al. | ............ 345/84 |
| 2005/0134552 A1 | 6/2005 | Schmitz et al. | |
| 2005/0134553 A1 | 6/2005 | Schmitz et al. | |
| 2005/0136244 A1 | 6/2005 | Schmitz et al. | |

* cited by examiner

Primary Examiner—D. Lawrence Tarazano
Assistant Examiner—Camie S Thompson
(74) Attorney, Agent, or Firm—Fay Sharpe LLP

(57) ABSTRACT

Electric paper with an anisotropic conductive island writing and viewing surface includes a ground plane, a media layer that is formed adjacent to the ground plane and that includes a plurality of microencapsulated multi-chromal particles, and a conductive layer formed adjacent to the media layer, wherein the conductive layer includes a plurality of embedded conductive fibers that form an anisotropic conductive island surface for writing and viewing images.

20 Claims, 6 Drawing Sheets

CONDUCTIVE ISLANDS FOR PRINTABLE ELECTRONIC PAPER

BACKGROUND

The following generally relates to electric paper. It finds particular application to using anisotropic conductive islands with electric paper. However, other applications are also contemplated.

Electric paper commonly is defined as any electronically-addressable display medium that approximates paper in form and function. Typically, electric paper is relatively lightweight, thin and flexible, and it should display images virtually indefinitely while consuming minimal power. In addition, electric paper should be reusable. Thus, it should be erasable and/or re-writeable. Images typically are displayed using reflected light and accommodate relatively wide viewing angles.

A known sheet and display system ("Gyricon") is disclosed in various patents and articles, such as U.S. Pat. No. 4,126,854 by Sheridon titled "Twisting Ball Display." The Gyricon display system is comprised of an elastomeric host layer of approximately 300 micrometers thick which is heavily loaded with rotating elements, possibly spheres, tens of micrometers (e.g. 100 micrometers) in diameter. Each rotating element has halves of contrasting colors, such as a white half and a black half. Each bichromal rotating element also possesses an electric dipole, nominally orthogonal to the plane that divides the two colored halves. Each bichromal rotating element is contained in its own cavity filled with a dielectric liquid. Upon application of an electric field between electrodes located on opposite surfaces of the host layer, the rotating elements will rotate depending on the polarity of the field, presenting one or the other colored half to an observer. Other known systems use color rotating elements in which each element includes one or more colors. Likewise, the polarity of the field determines which color presented to the observer.

A Gyricon sheet has many of the requisite characteristics of electric paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media and Addressing Device Therefor," describes an electric paper printing system that employs independent, external addressing means to put images on the Gyricon sheets. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the polarity of the electric fields.

Recent embodiments of these sheets usually incorporate charge-retaining islands thereon. Such embodiments are described in U.S. Pat. No. 6,235,395 B1, issued Apr. 24, 2001 and entitled "Charge Retention Islands for Electric Paper and Applications Thereof." In U.S. Pat. No. 6,235,395 B1, the Gyricon sheet is comprised of a first encapsulating layer patterned with conductive charge-retaining islands, a second encapsulating layer that may or may not be patterned with charge-retaining islands, and a sheet positioned there between. The first and second encapsulating layers include at least one transparent window through which the sheet can be viewed and provide at least one external surface patterned with charge retaining islands that can be stimulated with an external charge transfer device.

The charge-retaining islands typically are square and organized in a two-dimensional array. Channels of insulating material separate the charge-retaining islands. The channels serve to isolate the charge-retaining islands and should be small with respect to the charge-retaining islands so that the maximum possible area of the display is covered with conductive charge-retaining material. In one conventional technique, charge-retaining islands are created from conductive and transparent Indium Tin Oxide (ITO) on a transparent polyester film. The polyester is coated with a very thin layer of ITO, and then channels are etched in the ITO by photolithographic processes well known in the art. The remaining conductive ITO regions act as charge retaining islands, while insulating channels are created by the underlying polyester.

Typically, the charge-retaining islands are attached to a conductive island plane of the electric paper. As a consequence, one or more of the plurality of conductive islands can become separated from the electric paper. For example, wear associated with folding and/or crumbling the electric paper can result in detachment of one or more of the plurality of conductive islands from the conductive island plane. In another example, repeated folding can result in conductive island detachment from the conductive island plane. In view of at least the above-noted deficiencies with conventional electric paper, there is an unresolved need for new and improved electric paper and associated methods for forming the new and improved electric paper.

BRIEF DESCRIPTION

In one aspect, electric paper having an anisotropic conductive island surface is illustrated. The electric paper includes a ground plane formed adjacent to a media layer. The media layer includes a plurality of microencapsulated multi-chromal particles. The electric paper also has a conductive layer formed adjacent to the media layer. The conductive layer includes a plurality of embedded conductive fibers which form an anisotropic conductive island surface for writing and viewing images.

DETAILED DESCRIPTION

Figure 1:
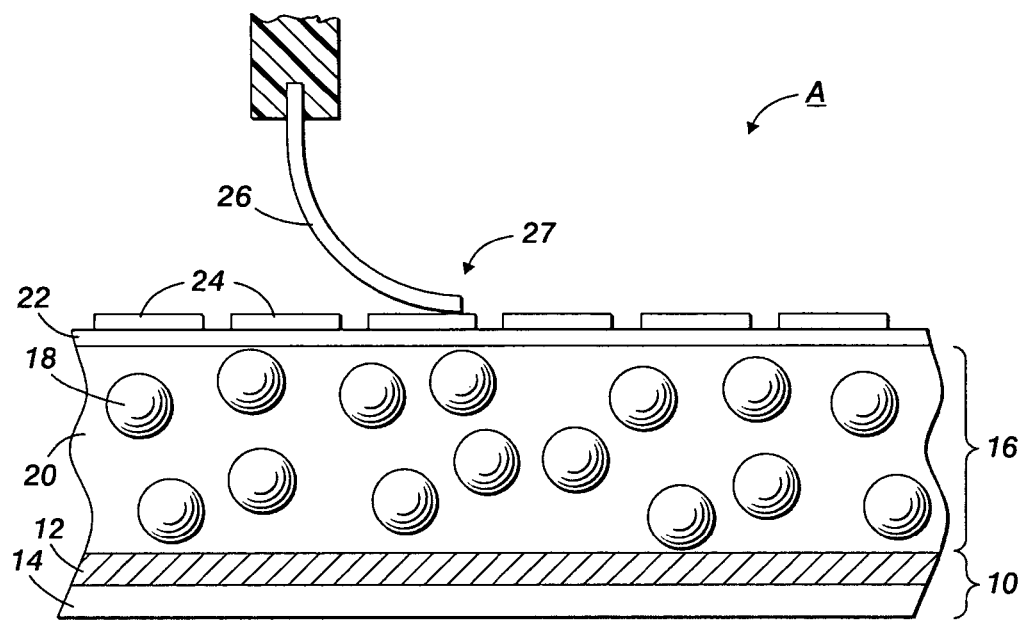
FIG. 1 illustrates conventional electric paper.

With reference to FIG. 1, a portion of conventional electric paper A is illustrated. The portion of conventional electric paper A includes a ground plane 10, which typically is from about 5 to about 10 micrometers in thickness and includes a conductive layer 12 and a polymer layer 14 (e.g., an insulating layer). The conductive layer 12 can be formed from carbon-filled silicone, nickel-filled silicone, pure silver-filled silicone, silver glass-filled silicone, silver copper-filled silicone, silver aluminum-filled silicone, and/or other conductive elastomeric materials with suitable properties. Although illustrated with two layers, it is to be appreciated that the ground plane 10 can include more or less layers. For example, in an alternative instance the ground plane 10 can be formed from a layer of conductive particles disposed between two elastomeric layers. In addition, the conductive particles can be spherically and/or irregularly shaped and/or include conductive fibers.

The portion of conventional electric paper A further includes a media plane layer 16, which typically is from about 10 to about 20 mils thick and includes a plurality of micro-encapsulated particles 18, each associated with at least one color, embedded within an elastomeric material 20. As depicted, the particles 18 can be spherically shaped. However, it is to be understood that other shapes can be used in other instances.

A conductive island plane layer 22 can be formed from plastic materials with various properties (e.g., clear, thin, flexible, etc.). The conductive island plane layer 22 supports a plurality of conductive islands 24. A printhead 26 transfers charge-to one or more of the plurality of conductive islands 24 in order to produce an electric field at the microencapsulated particles 18 (e.g., multi-chromal) such that an image (e.g., black and white, grey scale, color, etc.) is created on the portion of conventional electric paper A. Typically, the formed image is viewed from an image and/or viewing plane 27 of the portion of conventional electric paper A.

The plurality of conductive islands 24 are attached to the conductive island plane layer 22 through various techniques. For instance, an adhesive can be used to attach the plurality of conductive islands 24 to the conductive island plane layer 22. As a consequence, one or more of the plurality of conductive islands 24 can become separated from the conductive island plane layer 22. For example, wear associated with folding and/or crumbling the portion of conventional electric paper A can result in detachment of one or more of the plurality of conductive islands 24 from the conductive island plane layer 22 of the portion of conventional electric paper A.

Figure 2:
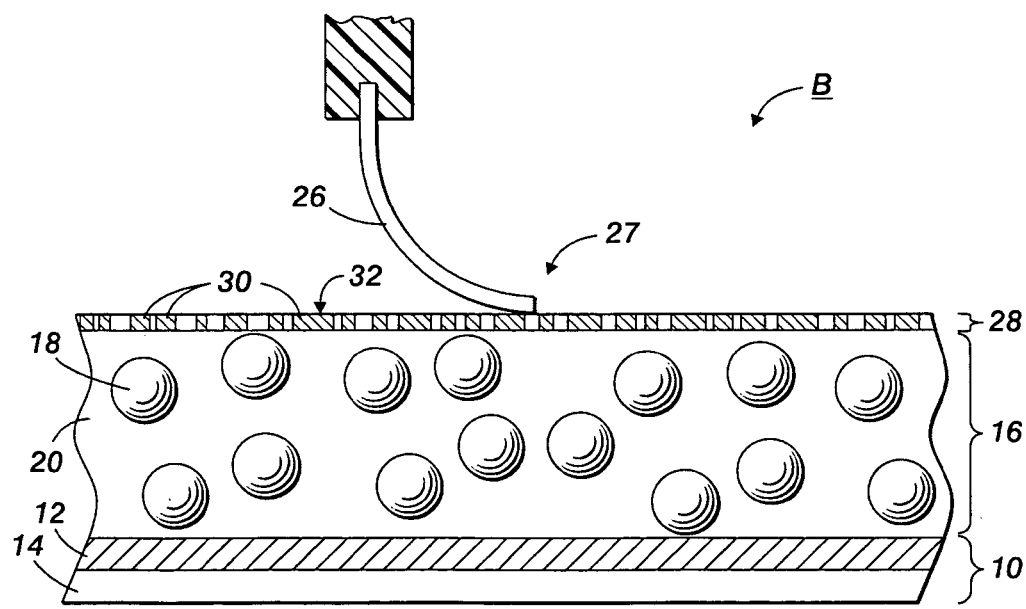
FIG. 2 illustrates a portion of electric paper with an anisotropic conductive island surface.

FIG. 2 illustrates a portion of electric paper B configured in accordance with an exemplary embodiment with an anisotropic conductive island surface. The electronic paper B includes the ground plane 10 formed from the conductive layer 12 and the polymer layer 14 (or other layers as described above). Formed adjacent to the ground plane 12 is the media plane layer 16, which includes the elastomeric material 20 with the micro-encapsulated multi-chromal particles 18 embedded therein.

An elastomer layer 28 (e.g., silicon rubber) is formed adjacent to the media plane layer 16. The elastomer layer 28 includes a plurality of conductive fibers 30. Unlike the conductive island plane layer 22 (described in connection with FIG. 1) in which the plurality of conductive islands 24 are separate structures attached thereto, the plurality of conductive fibers 30 are embedded within the elastomer layer 28. The fibers 30 travel through the elastomer 28 and typically are oriented, randomly and/or in an ordered (e.g., deterministic) manner, to form a conductive island surface 32 with fibers that are perpendicular to viewing plane 27. The fibers 30, in one embodiment, are used to form the conductive islands as anisotropic conductive islands, and in an alternative embodiment, are used to form the conductive islands as isotropic conductive islands.

Embedding the plurality of anisotropic conductive fibers 30 in the elastomer layer 28 mitigates the aforementioned as well as other deficiencies associated with the conventional electronic paper (e.g., the portion of conventional electronic paper A described above). For instance, since conductive fibers are embedded within the elastomer layer 28, separate conductive islands (e.g., the plurality of conductive islands 24) do not need to be attached to the electronic paper B. Thus, the resulting electric paper B is relatively more flexible and durable than conventional electronic paper, and repeated folding and/or crumbling of the electronic paper B does not result in detachment of separate conductive islands. Other benefits include improved manufacturability, decreased thickness, and increased electric field since the island fibers 28 travel through the elastomer 30. The increased electric field typically results in relatively lower voltage (e.g., including about zero volts) requirements as compared with conventional electronic paper. For example, voltages in a range from about one zero to about 100 volts are used in some instances.

Figure 3:
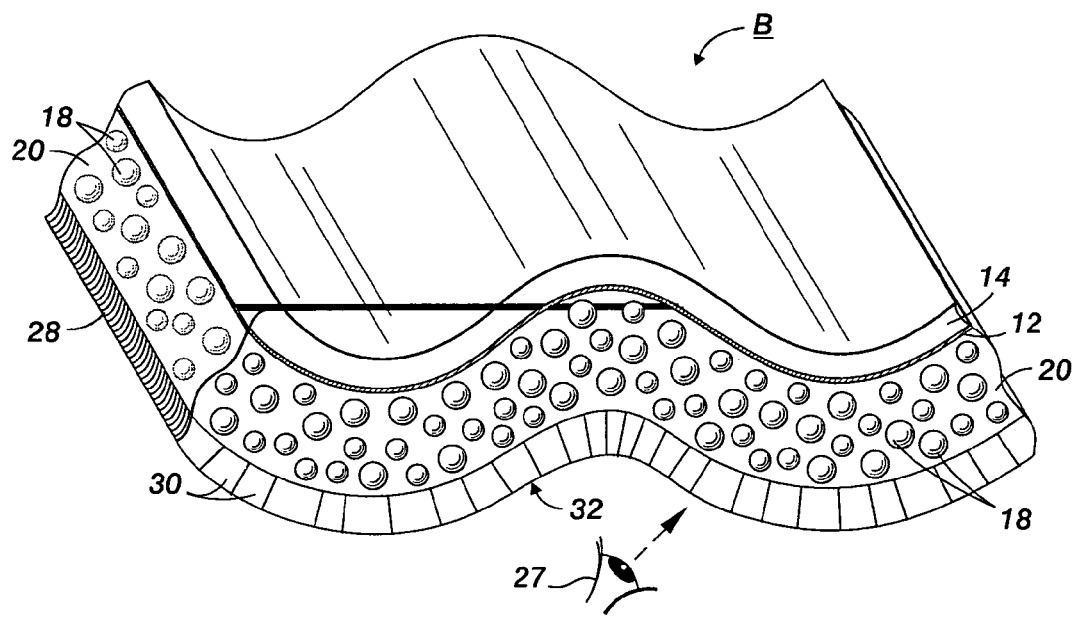
FIG. 3 illustrates a view of the portion of electric paper variously flexed.

With respect to FIG. 3, a view of the portion of electric paper B variously flexed is illustrated. The layer 28 with the fibers 30 form an anisotropic conductive island surface 32, which can be used as the viewing surface 27. The elastomeric material 20 with the plurality of micro-encapsulated particles 18 resides in between the layer 28 with the fibers 30 and the conductive layer 12, which, along with the polymer layer 14, forms the ground plane layer 10.

Figure 4:
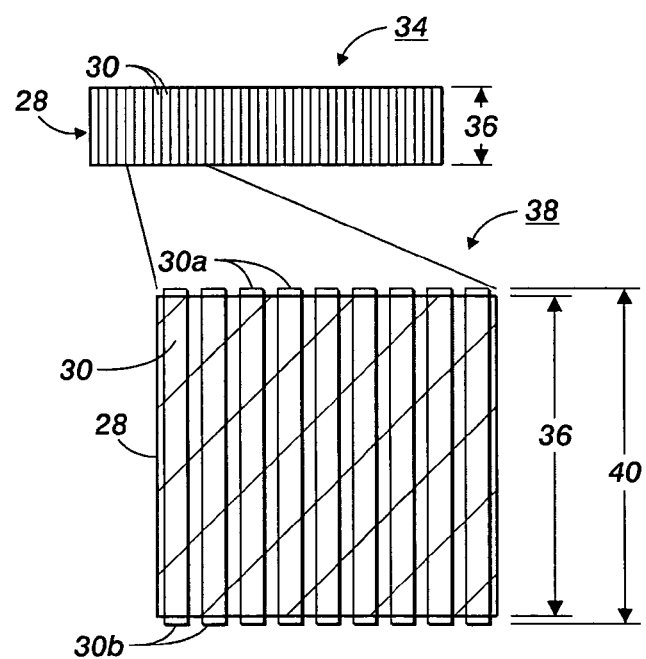
FIG. 4 illustrates exemplary side profiles of the portion of electric paper.

FIG. 4 shows side profiles of the portion of electric paper B. A side profile 34 illustrates the elastomer layer 28 with embedded fibers 30. The elastomer layer 28 has an elastomer layer thickness as depicted at 36. A magnified portion 38 of the side profile 34 shows that the fibers 30 can extend through the elastomer 28 and are associated with fiber lengths, as depicted at 40, that can be equal and/or different and that typically are greater than the elastomer layer thickness at 36. Particularly, fiber ends 30a extend past elastomer 20 to be positioned for contact with a printhead (e.g. the printhead 26 of FIG. 2), and fiber ends 30b extend past the elastomer 20 up to and/or in contact with the media plane 16. This design, which also removes the need of the mylar layer below the surface (as in FIG. 1), permits the use of lower voltages for the writing images to paper B).

Figure 5:
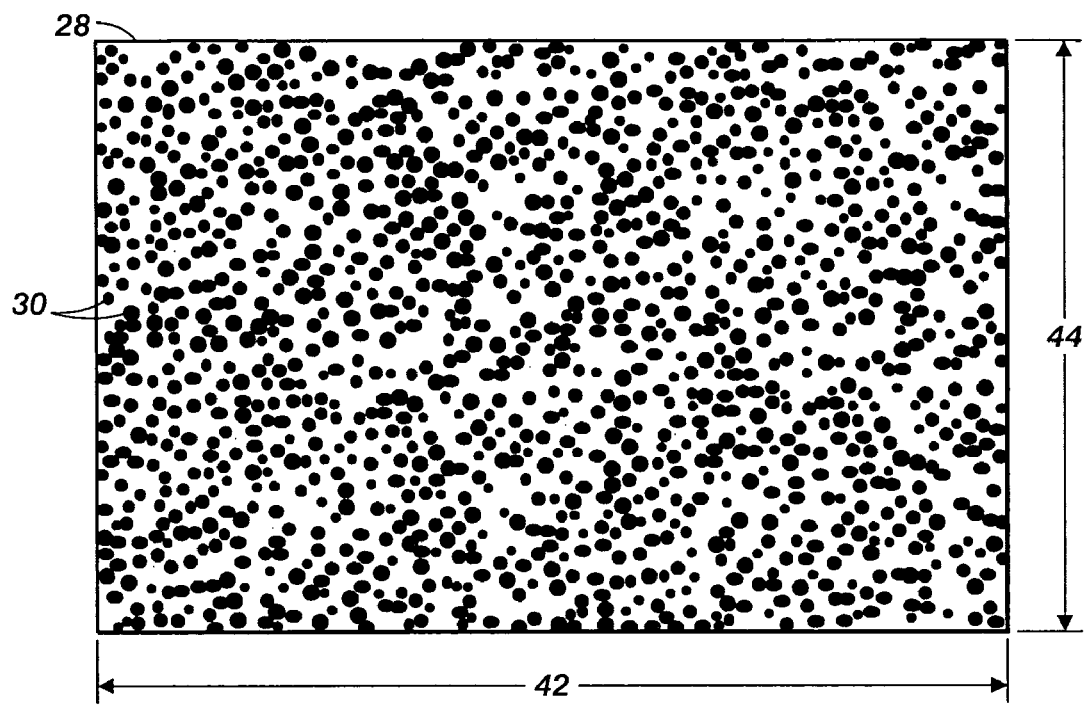
FIGS. 5-7 illustrate exemplary top profiles of the portion of electric paper.
Figure 6:
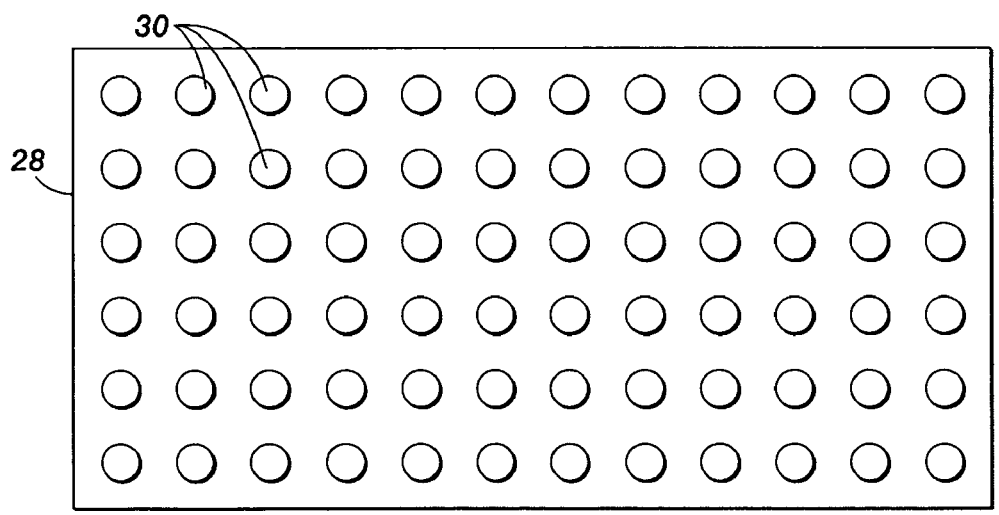
Figure 7:
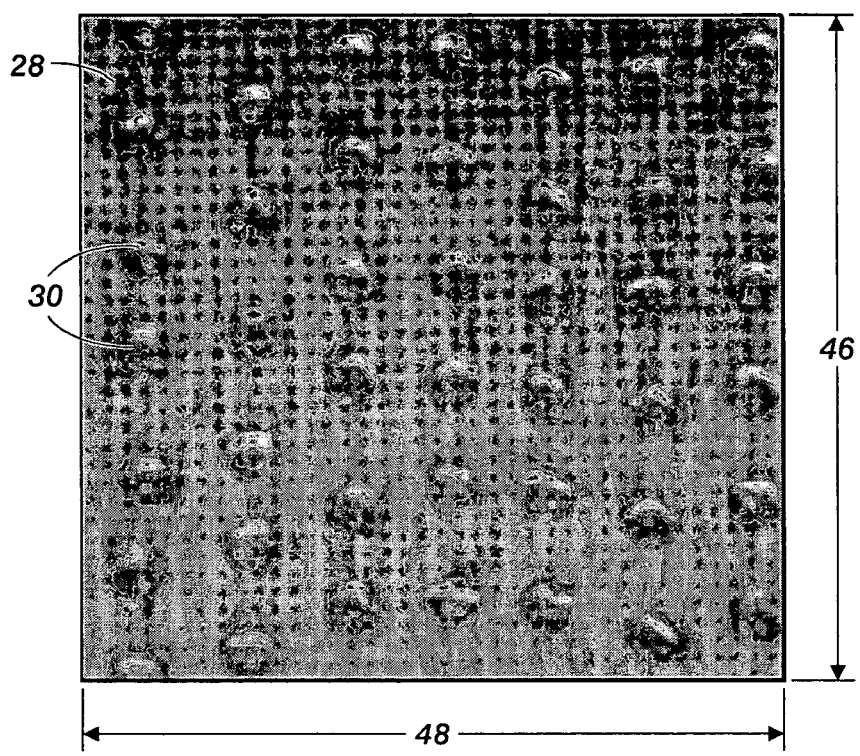

FIGS. 5, 6, and 7 show top profiles of the portion of electric paper B. FIG. 5 illustrates the portion of electric paper B with randomly positioned fibers 30 throughout an elastomer layer length 42 and an elastomer layer width 44. In FIG. 6, the fibers 30 are arranged throughout the elastomer 28 in an ordered manner or array. As depicted, the ordering can be based on a matrix configuration with one or more rows and one or more columns. However, it is to be appreciated that in other instances, various patterns can be used. For instance, FIG. 7 shows the portion of electric paper B in which the fibers 30 are substantially ordered in a first direction 46 and otherwise ordered in a second direction 48.

Figure 8:
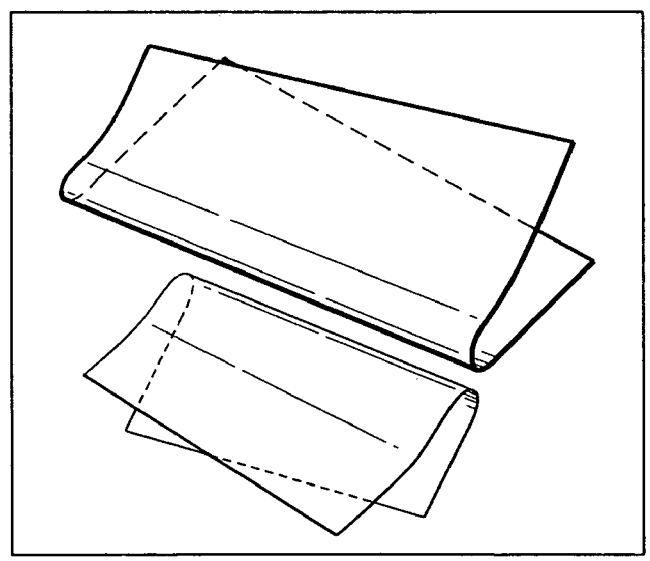
FIGS. 8 and 9 illustrates folded and crumpled electric paper.
Figure 9:
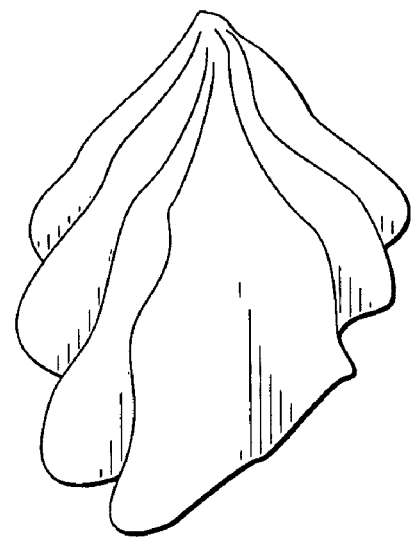

As briefly discussed above, embedding the fibers 30 within the elastomer 28 facilitates formation of flexible electronic paper. In many instances, hundreds or thousands of folds occur in the section of electronic paper B when folded or crumpled. In these instances, the section of electronic paper B can be crumpled or folded without detaching of the conductive islands attached thereto. FIG. 8 illustrates folded electric paper sheets, and FIG. 9 provides an example of the electric paper variously crumpled. In both FIG. 8 and FIG. 9, the embedded fibers 30 and, thus, the anisotropic conductive island surface 32 or the viewing surface 27 remain intact and do not detach as possible with the conductive islands 22 associated with the conventional electric paper A. Since elastomeric material can be used throughout all layers of the electric paper B, it is to be appreciated that the electronic paper B can be crumpled into a tight wad and then unfolded, wherein it will return to its original shape without detachment of the embedded fibers 30, the anisotropic conductive island surface 32, or the viewing surface 27.

Figure 10:
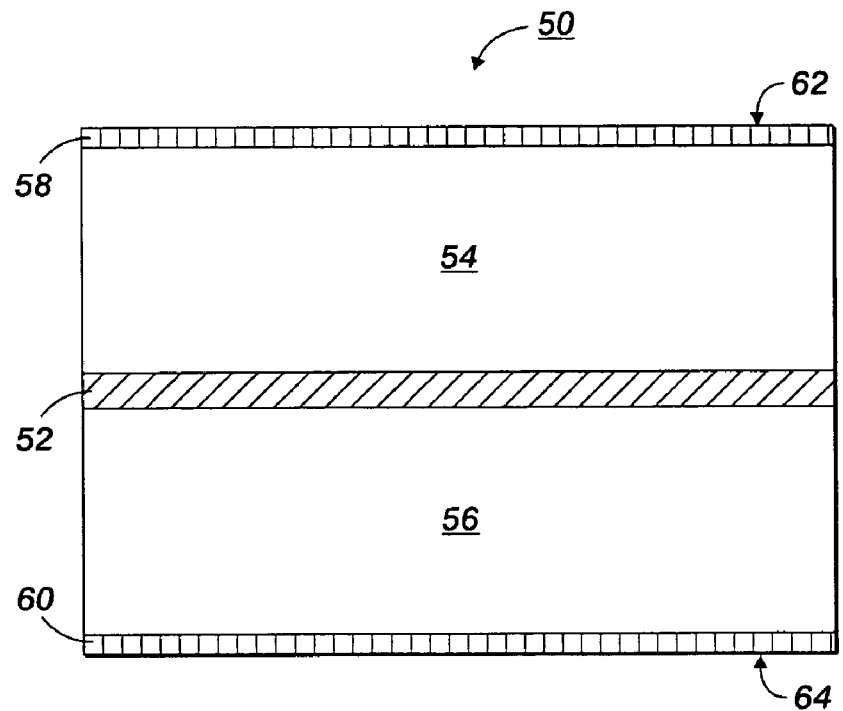
FIG. 10 illustrates dual sided electric paper.

FIG. 10 illustrates a dual-sided electric paper 50 configuration. The dual-sided electric paper 50 includes a ground plane 52, which can be a common ground plane or separate ground planes coupled together. Adjacent to different sides of the ground plane 52 are distinct media planes 54 and 56. An elastomeric layer 58 with embedded conductive fibers is formed adjacent to the media plane 54, and an elastomeric layer 60 with embedded conductive fibers is formed adjacent to the media plane 56. For both the elastomeric layers 58 and 60, the fibers are oriented randomly and/or in an ordered manner. In addition, the fibers are anisotropically positioned and form anisotropic conductive island surfaces 62 and 64, both of which can be used as viewing surfaces. Printheads or other like devices can be used to generate images on the surfaces 62 and 64.

Figure 11:
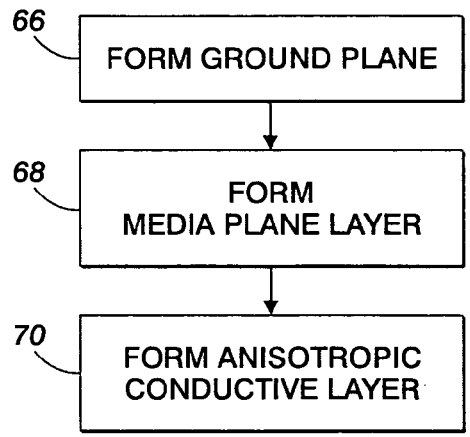
FIG. 11 illustrates method for producing electric paper with an anisotropic conductive island surface is illustrated.

With reference to FIG. 11, a method for producing electric paper with an anisotropic conductive island surface is illustrated. It is to be appreciated that the acts described are for explanatory purposes and are not limiting. Thus, more or less acts in similar or different ordering are contemplated. At reference numeral 66, a ground plane is formed. The ground plane can include one or more layers, including a conductive and a polymer (e.g., an insulating) layer. Both layers can be formed from elastomeric materials, and the conductive layer can include variously shaped (e.g., sphere, irregular, etc.) conductive particles and/or fibers. At 68, a media plane layer is formed adjacent to the ground plane. The media plane layer can be formed from an elastomeric material and typically includes a plurality of variously shaped micro-encapsulated multi-chromal particles.

At 70, an anisotropic conductive layer with embedded conductive islands is formed adjacent to the media plane layer. The anisotropic conductive layer typically is formed from an elastomeric material and includes a plurality of conductive fibers that extend through the elastomeric material, perpendicular to a viewing surface. The fibers are anisotropically positioned and form anisotropic conductive island surface that is used as a viewing surface. Optionally, multiple sheets of the electric paper are coupled to form multi-sided electric paper. In one instance, the multiple sheets are coupled together via ground planes. Printheads and the like are then used to generate images on conductive island surfaces.

Figure 12:
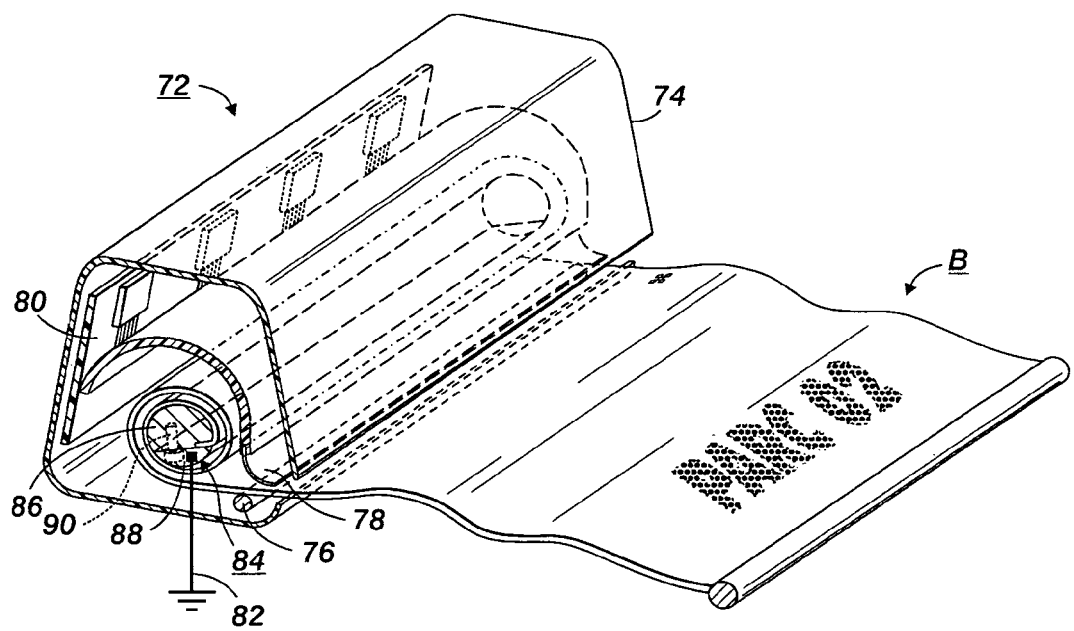
FIG. 12 illustrates a non-limiting example of a use of the electric paper.

FIG. 12 illustrates one non-limiting example of a use of the electric paper B. A scroll printer 72 for printing on the electric paper B includes a case 74, a support roller 76, a printhead 78, electronics 80, a common ground 82, and an axle 84 upon which the electric paper B is rolled. The paper B can be rolled out during the printing process in a variety of manners depending on the application. For example, a wand printer may roll and unroll the paper in different manners than a billboard sized printer. The paper B is shown as being clamped within the axle 84. In such instances, the axle 84 includes a first portion 86 and a second portion 88 that are connected together at 90 using, for example, a screw, an adhesive, a bolt, rivet, and the like. This connection can provide a grounding line for the ground plane 10.

It is to be appreciated that the above described can be used with encapsulated, sheet formed, and/or other media. In addition, it will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

The invention claimed is:

1. Electric paper with a conductive island writing and viewing surface, comprising:
   a ground plane;
   a media layer that is formed adjacent to the ground plane and that includes a plurality of microencapsulated particles, each associated with at least one color; and
   a conductive layer formed adjacent to the media layer, the conductive layer includes a plurality of embedded conductive fibers that form a conductive island surface for writing and viewing images.

2. The electric paper as set forth in claim 1, wherein the conductive layer is embedded with a plurality of conductive fibers that are positioned perpendicular to a viewing surface of the electric paper.

3. The electric paper as set forth in claim 1, wherein the conductive layer includes a plurality of conductive fibers that are randomly and/or deterministically arranged in an elastomeric material.

4. The electric paper as set forth in claim 1, wherein the conductive layer includes at least one of an elastomer and silicon rubber with the plurality of conductive fibers embedded therein.

5. The electric paper as set forth in claim 1, wherein the conductive fibers include first and second ends extending past the conductive layer, the first fiber end positioned for contact with a printhead and the second fiber end positioned for contact with the media layer.

6. The electric paper as set forth in claim 1, wherein the conductive layer is associated with a higher electric field relative to a conductive island plane layer with conductive islands mounted thereon.

7. The electric paper as set forth in claim 1, wherein the conductive layer is activated with voltages in a range of less than 1 volt to about 100 volts.

8. The electric paper as set forth in claim 1, wherein the conductive layer includes one or more conductive fibers that extend through an elastomeric material of the conductive layer.

9. The electric paper as set forth in claim 1, further including:
   a second media layer formed on an opposite side of the ground plane, the second media layer includes microencapsulated particles; and
   a second conductive layer having a second plurality of conductive fibers that is formed adjacent to the second media layer and that provides a second conductive island surface for writing and viewing images 10. The electric paper as set forth in claim 1, wherein the ground plane includes a polymer layer and a conductive layer.

11. The electric paper as set forth in claim 1, wherein the ground plane includes a conductor and an insulator.

12. The electric paper as set forth in claim 1, wherein the microencapsulated particles are at least one of spherical and irregularly shaped.

13. An apparatus for printing on the electric paper of claim 1.

14. A method for producing electric paper with a conductive island surface is illustrated, comprising:
   forming a ground plane layer;
   forming a media plane layer adjacent to the ground plane layer; and
   forming a conductive layer with embedded conductive fibers adjacent to the media plane layer, the conductive layer provides a writing/viewing surface.

15. The method as set forth in claim 14, further including positioning the conductive fibers within the conductive layer perpendicular to the viewing surface.

16. The method as set forth in claim 14, further including extending the conductive fibers through an elastomeric layer of the conductive layer.

17. The method as set forth in claim 14, further including randomly and/or deterministically arranging the conductive fibers within the conductive layer.

18. The method as set forth in claim 14, wherein the conductive layer forms an anisotropic conductive island surface.

19. The method as set forth in claim 14, further including:
   forming a second media layer on an opposite side of the ground plane; and
   forming a second conductive layer with embedded conductive fibers adjacent to the second media layer to provide a second writing/viewing surface.

20. Electric paper, comprising:
   a first layer having a polymer and a conductive layer formed adjacent to the polymer layer;
   a second layer formed over the first layer, the second layer including a plurality of microencapsulated multi-chromal particles embedded within the elastomeric material; and
   a third layer formed over the second layer, the third layer including an elastomer and a plurality of conductive fibers anisotropically embedded within and extending through the elastomer to form a writing/viewing surface.

* * * * *